United States Patent [19]

Hara

[11] 4,313,124

[45] Jan. 26, 1982

[54] LIQUID JET RECORDING PROCESS AND LIQUID JET RECORDING HEAD

[75] Inventor: Toshitami Hara, Tokyo, Japan

[73] Assignee: Canon Kabushiki Kaisha, Tokyo, Japan

[21] Appl. No.: 149,429

[22] Filed: May 13, 1980

[30] Foreign Application Priority Data

| | | | |
|---|---|---|---|
| May 18, 1979 | [JP] | Japan | 54/62079 |
| Jun. 1, 1979 | [JP] | Japan | 54/68566 |
| Jun. 1, 1979 | [JP] | Japan | 54/68567 |
| Jun. 1, 1979 | [JP] | Japan | 54/68568 |
| Jun. 1, 1979 | [JP] | Japan | 54/68569 |
| Jul. 12, 1979 | [JP] | Japan | 54/88729 |

[51] Int. Cl.[3] .............................................. G01D 15/18

[52] U.S. Cl. .................................. 346/140 R; 346/1.1

[58] Field of Search ............................ 346/140 PD, 1

[56] References Cited

U.S. PATENT DOCUMENTS

| | | | |
|---|---|---|---|
| 4,243,994 | 1/1981 | Kobayashi et al. | 346/140 PD |
| 4,251,824 | 2/1981 | Hara et al. | 346/140 PD |

*Primary Examiner*—George H. Miller, Jr.

*Attorney, Agent, or Firm*—Fitzpatrick, Cella, Harper & Scinto

[57] ABSTRACT

A liquid jet recording process and liquid jet recording head are driven by heat energy generated by an electrothermal transducer. The operating conditions as to heating and others are disclosed and further desirable dimensions of the electrothermal transducer are determined by referring to various characteristics of the structure materials and others.

7 Claims, 11 Drawing Figures

LIQUID JET RECORDING PROCESS AND LIQUID JET RECORDING HEAD

BACKGROUND OF THE INVENTION

1. Field of the Invention

The present invention relates to a liquid jet recording process where a liquid is ejected to form liquid droplets and projected to a record member, and a liquid jet recording head.

2. Description of the Prior Art

Non-impact recording processes have recently drawn attention since the noise accompanying recording operation is negligibly small.

Among them, ink jet recording process (liquid jet recording processes) which can effect a high speed recording and can record on plain paper without fixation are very powerful processes. Heretofore, a wide variety of the systems and apparatuses therefor have been proposed. Some of them have been practically operated while others are now under development.

Liquid jet recording process disclosed in Japanese Patent Laid Open No. Sho 54-51837, Deutsch Offenlegungsschrift No. 2843064, U.S. Application Ser. No. 948236, filed Oct. 3, 1978, has a feature different from other liquid jet recording methods. The feature is that heat energy is applied to a liquid to produce an actuating force for ejecting the liquid.

The above-mentioned patent applications disclose a recording process in which a liquid causes a change of the state accompanying an abrupt increase in volume by application of heat energy and the actuating force due to the change of the state functions to eject liquid droplets from the orifice at the tip of a recording head and project the droplets to a record receiving member. The recording head comprises a liquid ejecting portion including an orifice for ejecting a liquid droplet. A heat actuating portion communicating with the orifice and having a heating surface adapted to apply heat energy to the liquid, and an electrothermal transducer for generating heat energy which is coupled to the heat actuating portion.

The liquid jet recording process of Deutsch Offenlegungsschrift No. 2843064 is effectively applied to so-called drop-on-demand type recording process and moreover, the recording head can be easily constructed in the form of a high density multiorifice system of a full line type. As the result, images of high resolution and high quality can be produced at a high speed.

In this way, the above-mentioned liquid jet recording process has excellent features, but it is necessary for a higher speed recording of such images of high resolution and high quality that the number of the liquid droplets ejected from one orifice per unit time ($N_o$), that is, the liquid droplet ejecting efficiency, is increased.

In short, according to the above mentioned liquid jet recording process, bubbles are generated by a heat action and the abrupt increase and decrease of the volume causes the corresponding abrupt change of state and thereby, liquid droplets are projected from the orifice of the recording head to effect recording. It is necessary to increase $N_o$ by shortening the time for repeating the increase and decrease in volume (improvement in the liquid droplet ejection repeating property). It is a proposed to increase the decaying speed of the increased bubble volume which is rate controlling stage, for the purpose of improving said liquid droplet ejection repeating property.

For example this can be effected by providing the recording head portion with a cooling means such as Peltier element and the like so as to cool forcibly the heat generating portion of the electrothermal transducer and the liquid and making the decaying curve of bubble volume resulting in increase in $N_o$.

When the decaying curve of bubble volume is made steep, the above problem can be solved to some extent, but when the curve becomes steeper than a certain value, meniscus of the liquid formed in the vicinity of the orifice retreats too much and air is sucked into the liquid and further, supply of the liquid to the heat actuating portion becomes unstable resulting in insufficient supply of the liquid. As the result, the following drawbacks appear, that is, non-uniform amount of the ejected liquid droplet, irregular ejecting direction, non-uniform liquid droplet ejecting speed, lowering of fidelity of response to recording signals and assurance of response, and lowering of recorded image quality and stoppage of recording.

When such a special cooling means is arranged at the recording head, the recording apparatus becomes complicated and expensive, and, in particular, such disadvantages are remarkable in case of a recording head of a multi-orifice type. Furthermore, in case of a recording head of a high density multi-orifice type, the result is far poorer since a high grade of precision technique is required for manufacturing such recording head from the view points of structure, processing and fabrication and therefore this results in a low yield, high cost and difficult maintenance.

Further, when the above mentioned cooling means is used to effect a forced cooling so as to accelerate reduction of volume of the generated gas, the cooling efficiency is low because the cooling of the bubble is carried out indirectly by cooling the liquid surrounding the bubble. The response of the cooling means is so slow that improvement in the repeating liquid droplet ejecting property is limited. If it is contemplated to increase the cooling velocity, it is necessary to excessively cool the liquid surrounding the bubble. This results in lowering of liquid droplet ejecting property and other disadvantages.

These disadvantages cause unstable supply of the liquid to the heat actuating portion in the recording head, non-liquid volume of ejected liquid droplets, non-uniform speed for ejecting liquid droplets, lowering of fidelity and accuracy of response to recording signals and like, lowering of recording image quality, and stoppage of recording.

In order to improve the liquid droplet ejecting efficiency, it is necessary that heat energy generated by the electrothermal transducer is applied such that the heat energy is effectively consumed for ejecting liquid droplets.

In case of conducting a continuous recording, it is required that the heat energy is repeatedly generated in response to input recording signals with high fidelity and assurance and the generated heat energy rapidly actuates the liquid in the heat actuating portion. In particular, in case of a high speed recording, this repeated actuation should be effected with high fidelity to input recording signals to the electrothermal transducer. Or, in order to improve the quality of recorded images and effect a high speed recording, there are required stabilization of the liquid droplet ejecting direction, preventing the formation of satellite droplets, stable, continuous and long time, repeated ejection of liquid droplets, and improvement in liquid droplet ejecting efficiency (number of liquid droplets ejected per unit time) and the liquid droplet ejecting speed.

In conventional ink jet recording apparatuses, these drawbacks are not fully solved.

SUMMARY OF THE INVENTION

An object of the present invention is to provide a liquid jet recording process and liquid jet recording head capable of stably and continuously recording images of high resolution and high quality for a long period of time at a high speed.

According to one aspect of the present invention, there is provided a liquid jet recording process utilizing a recording head comprising, a liquid ejecting portion including an orifice for ejecting a liquid droplet and a heat actuating portion communicating with the orifice and contacting a heating surface adopted to apply heat energy for ejecting a liquid droplet to the liquid and an electrothermal transducer for generating heat energy which comprises: conducting the recording under a condition that an average value of a bubble volume changing ratio, (dV/dt)/Vmax is at least $5\times10^3$ $sec^{-1}$, where dV/dt is a change of the volume V of a bubble per unit time when the volume of bubble increases, the bubble being produced by the heat energy which is generated at the electrothermal transducer energized by an input electric signal and is applied to the liquid in the heat actuating portion, and Vmax is the maximum volume of the bubble. According to another aspect of the present invention there is provided a liquid jet recording process utilizing a recording head comprising, a liquid ejecting portion including an orifice for ejecting a liquid droplet and a heat actuating portion communicating with the orifice and contacting a heating surface adapted to apply heat energy for ejecting a liquid droplet to the liquid and an electrothermal transducer for generating heat energy, and producing a bubble in the heat actuating portion by the heat energy generated by the electrothermal transducer upon applying an electric signal to the transducer which comprises conducting the recording under a condition.

$$1/5\tau_o \leqq \tau_{1/2} \leqq 10\tau_o$$

$$\text{at } 0<\tau_o\leqq 10\ \mu s,$$

or $$2\ \mu s \leqq \tau_{1/2} \leqq 10\tau_o$$

$$\text{at } 10\ \mu s<\tau_o$$

where $\tau_o$ is a time during which an electric signal is applied, V is a volume of a bubble produced when the electric signal is applied, Vmax is the maximum value of V, and $\tau_{1/2}$ is a time required to decrease the volume of the bubble from Vmax to Vmax/2.

According to a further aspect of the present invention, there is provided a liquid jet recording process utilizing a recording head comprising, a liquid ejecting portion including an orifice for ejecting a liquid droplet and a heat actuating portion communicating with the orifice and contacting a heating surface adapted to apply heat energy for ejecting a liquid droplet to the liquid and an electrothermal transducer for generating heat energy which comprises:

conducting the recording under a condition that the average value $$\left(\frac{dT}{dt}\right)$$

of a change of a temperature T per unit time during the time form beginning of a temperature rise at a temperature Ti to reaching the maximum temperature Tp is at least $1\times10^6$°C./sec, where T is a temperature of the heating surface when the electric signal is applied to the electrothermal transducer.

According to still another aspect of the present invention, there is provided a liquid jet recording process utilizing a recording head comprising, a liquid ejecting portion including an orifice for ejecting a liquid droplet and a heat actuating portion communicating with the orifice and contacting a heating surface adapted to apply heat energy for ejecting a liquid droplet to the liquid and an electrothermal transducer for generating heat energy which comprises:

conducting the recording under a condition that $$y_o \leqq y_{1/2} \leqq 4y_o$$

$$\text{at } 0<y_o\leqq 10\ \mu s,$$

or $$10\ \mu s \leqq y_{1/2} \leqq 4y_o$$

$$\text{at } 10\ \mu s<y_o$$

where $y_o$ is a time from beginning of temperature rise of a temperature T at a temperature Ti to reaching the maximum temperature Tp, the temperature T being a temperature of the heating surface when an electric signal is applied to the electrothermal transducer by an on-off operation, and $y_{1/2}$ is a time required to decrease the temperature from Tp to (Tp-Ti)/2.

According to a still further aspect of the present invention, there is provided a liquid jet recording head which comprises, a liquid ejecting portion including an orifice for ejecting a liquid droplet and a heat actuating portion communicating with the orifice and contacting a heating surface adapted to apply heat energy for ejecting a liquid droplet to the liquid and an electrothermal transducer for generating heat energy, the electrothermal transducer having a layer structure such that a lower layer, a resistive heater layer and an upper layer are laminated in the above order in the direction from a substrate to the heat actuating portion and the following conditions are satisfied:

$$\sqrt{\frac{k_2}{C_2\rho_2}\tau} \leqq L \leqq A - B \quad (1)$$

$$L_1 < \sqrt{\frac{k_1C_2\rho_2}{k_2C_1\rho_1}} \cdot L_2 \quad (2)$$

where $L=L_1+L_H+L_2$, $L_1$, $L_H$ and $L_2$ are thicknesses at a portion corresponding to the heat actuating portion of the upper layer, the resistive heater layer and the lower layer, respectively, $$A = \frac{S_t}{Q} \cdot \Delta T \cdot \left( \frac{k_1\beta_2 + k_2\beta_1}{\beta_1 + \beta_2} \right)$$

$$B = \frac{k_2 L_H}{k_H}$$

$$\beta_1 = \sqrt{C_1\rho_1 k_1}\ ,\ \beta_2 = \sqrt{C_2\rho_2 k_2}$$

$C_1$: specific heat of the upper layer.
$C_2$: specific heat of the lower layer.
$k_1$: Thermal conductivity of the upper layer.
$k_2$: Thermal conductivity of the lower layer.
$k_H$: Thermal conductivity of the resistive heater layer.
$\rho_1$: Density of the upper layer.
$\rho_2$: Density of the lower layer.
$\tau$: Half-width of an electric signal applied to the electrothermal transducer.
$t$: A time between the application of one electric signal and the application of another electric signal.
$S$: Area of the heating surface of the upper layer facing the heat actuating portion.
$\Delta T$: An average value of temperature difference between the surface temperature of the heating surface and the surface temperature of the surface facing the substrate of the lower layer.
$Q$: Quantity of heat generated by one electric signal.

DESCRIPTION OF THE PREFERRED EMBODIMENTS

Figure 1A:
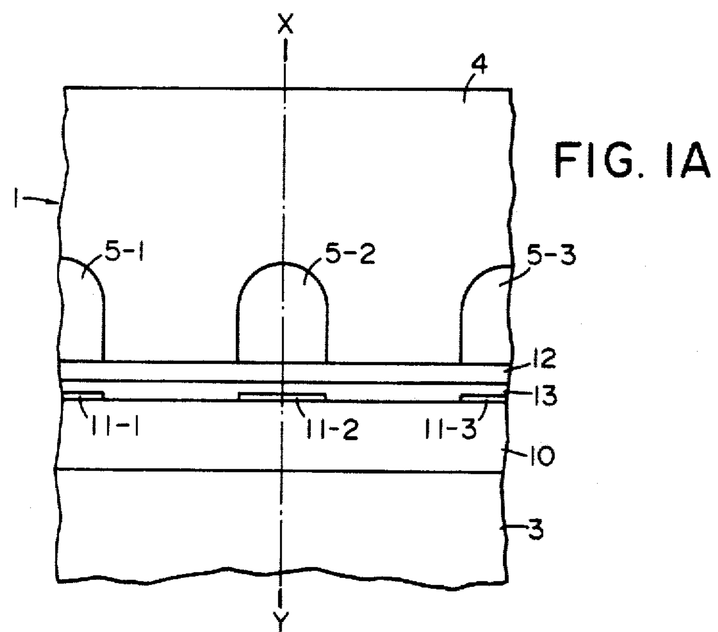
FIG. 1A is a partial front view from the orifice side of an embodiment of a liquid jet recording head according to the present invention.
Figure 1B:
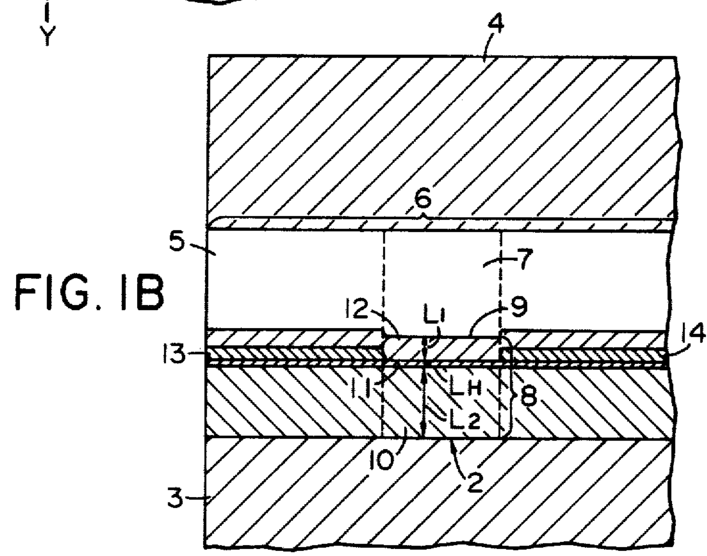
FIG. 1B is a cross sectional view taken along the dot and dash line X-Y of FIG. 1A.

FIG. 1A is a part of the front view from the orifice side of a liquid jet recording head to which the process of the present invention may be applied, and FIG. 1B is a cross sectional view taken along the line X—Y of FIG. 1A.

A recording head 1 is constructed as follows. The surface of a substrate 3 is provided with an electrothermal transducer 2. A grooved plate 4 having a predetermined number of grooves of a predetermined width and depth at a predetermined line density is mounted on the surface of substrate 3 to form orifices 5-1, 5-2 and 5-3 and liquid ejecting portions 6. The recording head in the drawing is provided with a plurality of orifices 5-1, 5-2 and 5-3, but the present invention is not restricted to the illustrated embodiment, but can be applied to a recording head of a single orifice.

Liquid ejecting portion 6 includes orifice 5 at the end portion for ejecting the liquid droplets and a heat actuating portion 7 where heat energy generated by electrothermal transducer 2 acts on the liquid to form a bubble and an abrupt state change is caused by expansion and shrinking of the liquid volume.

Heat actuating portion 7 is located on the heat generating portion 8 of electrothermal transducer 2, and the bottom of heating actuating portion 7 is a heating surface 9 of the heat generating portion 8 and contacting the liquid.

Heat generating portion 8 includes a lower layer 10 mounted on substrate 3, a resistive heater layer 11 overlying the lower layer 10 and an upper layer 12 overlying the resistive heater layer 11. On the layer 11 are arranged electrodes 13 and 14 for conducting electric current to the layer 11. Electrode 13 is an electrode common to the heat generating portions of the liquid ejecting portions while electrode 14 is a selective electrode for selecting a heat generating portion of a particular liquid ejecting portion to generate heat and is arranged along the flow path of the liquid ejecting portion.

An upper layer 12 serves to protect chemically and physically the resistive heater layer 11 from the liquid in the liquid ejecting portion 6 by separating the resistive heater layer 11 from the liquid, and further the upper layer 12 prevents electrodes 13 and 14 from shortcircuiting through the liquid.

Upper layer 12 can function as mentioned above, but where resistive heater layer 11 is resistant to the liquid and there is no fear of shortcircuit between electrodes 13 and 14 through the liquid, it is not always necessary to provide such layer 12 and the electrothermal transducer may be constructed in such a way that the liquid directly contacts the surface of resistive heater layer 11.

The lower layer 10 has mainly a function of controlling the heat flow, that is, physical characteristics and the layer thickness and selected such that when a liquid droplet is ejected, the heat generated at the resistive heater layer 11 and transferred to the substrate 3 is in an amount smaller than transferred to the heat actuating portion 7 as far as possible while, after ejecting a liquid droplet, i.e. after switching off the electric current to the resistive heater layer 11, the heat accumulated in the heat actuating portion 7 and the heat generating portion is rapidly transferred to the substrate 3 to cool rapidly the liquid in the heat actuating portion.

In order to attain the above mentioned purpose and thereby increasing efficiency of liquid droplet ejecting energy, improving the thermal response property and the continuously repeating liquid droplet ejecting property and improving the liquid droplet ejecting frequency, the layer thickness relation among upper layer 12, resistive heater layer 11 and lower layer 10 should be selected as shown below, and these layers should be superposed on substrate 3 to construct a heat generating portion 8.

$L = L_1 + L_H + L_2$
$L_1$: thickness of upper layer 12
$L_2$: thickness of lower layer 10
$L_H$: thickness of resistive heater layer 11

$$\sqrt{\frac{k_2}{C_2\rho_2}\tau} \leq L \leq A - B \qquad (1)$$

-continued $$L_1 < \sqrt{\frac{k_1 C_2 \rho_2}{k_2 C_2 \rho_1}} \cdot L_2 \quad (2)$$

$$A = \frac{St}{Q} \cdot \Delta T \cdot \left( \frac{k_1 \beta_2 + k_2 \beta_1}{\beta_1 + \beta_2} \right)$$

$$B = \frac{k_2 L_H}{k_H}$$

$$\beta_1 = \sqrt{C_2 \rho_1 k_1}, \quad \beta_2 = \sqrt{C_2 \rho_2 k_2}$$

$$A - B > O$$

$C_1$: Specific heat of the upper layer 12.
$C_2$: Specific heat of the lower layer 10.
$k_1$: Thermal conductivity of the upper layer 12.
$k_2$: Thermal conductivity of the lower layer 10.
$k_H$: Thermal conductivity of the resistive heater layer 11.
$\rho_1$: Density of the upper layer 12.
$\rho_2$: Density of the lower layer 10.
$\tau$: Half-width of an electric signal $P$ applied to the electrothermal transducer 2.
$t$: A time between the application of one electric signal and the application of another electric signal.
$S$: Area of the heating surface of the upper layer 12 facing the heat actuating portion 7.
$\Delta T$: An average value of temperature difference between the surface temperature of the heating surface 9 and the surface temperature of the surface facing the substrate 3 of the lower layer 10.
$Q$: Quantity of heat generated by one electric signal.

Figure 2:
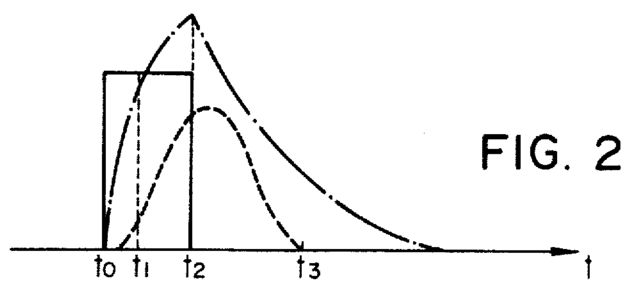
FIG. 2 is a timing chart showing changes of electric signals applied to a recording head, a surface temperature of a heating surface 9 and volume of a bubble according to the lapse of time.

Referring to FIG. 2, there are shown changes in connection with the lapse of time of a surface temperature T of a heating surface 9 and a volume V of a bubble generated upon applying an electric signal P of the pulse wave as shown by the solid line to an electrothermal transducer 2 of a recording head constructed according to the present invention. The dot and dash line represents the change of surface temperature T of the heating surface 9 as the time lapses, and the dotted line indicates the change of volume V of a generated bubble with respect to the lapse of time.

Figure 3A:
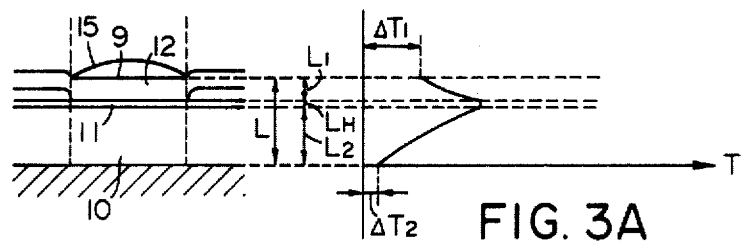
FIG. 3A, FIG. 3B and FIG. 3C are schematic figures showing the state of the bubble and the temperature distribution in the direction of thickness at the heat generating portion 8 at times $t_1$, $t_2$ and $t_3$ in FIG. 2, respectively.
Figure 3B:
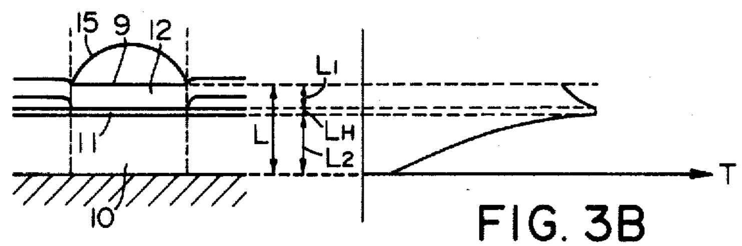
Figure 3C:
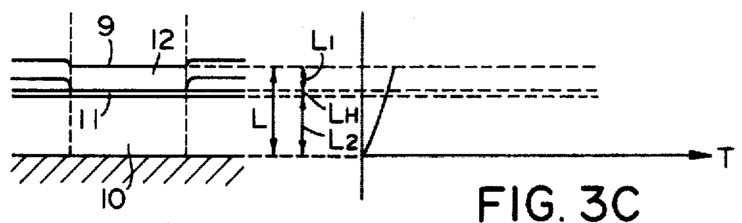

Referring to FIG. 3A, there is shown an intermediate stage of bubble growing. FIG. 3B shows a stage when the surface temperature T of a heating surface 9 reaches the maximum temperature. FIG. 3C shows a stage immediately after the formed bubble disappeared.

As is clear from the figures showing the temperature distribution, the liquid jet recording head according to the present invention exhibits a very good efficiency of transferring the liquid generated at the heat generating portion 8 to the liquid, and when the current conducted to the resistive heater layer 11 is off, the heat in the heat actuating portion 7 and the heat generating portion 8 is rapidly discharged to the side of the substrate 2 so that the volume V of a grown-up bubble is rapidly decreased resulting in disappearing or a negligibly small volume.

In this way, the liquid jet recording head of the present invention exhibits a high heat transfer efficiency to the liquid upon ejecting a liquid droplet and a high efficiency of heat discharging to the substrate 2 side upon switching off the current and thus, the liquid droplet ejecting characteristics are excellent.

Taking into consideration that the material to be heated which contacts the heating surface 9 of the heat generating portion 8 is a liquid or a bubble formed in a liquid, the relation between the heat conducting property and the layer thicknesses of upper layer 12, resistive heater layer 11 and lower layer 10 constituting the heat actuating portion 7 in connection with the physical properties, in particular, the relation between thicknesses of upper layer 12 and lower layer 10 in connection with heat flow controlling characteristics, has been systematically studied, and the thickness of each layer is designed to satisfy formulas (1) and (2) derived as the result of the study.

Figure 4:
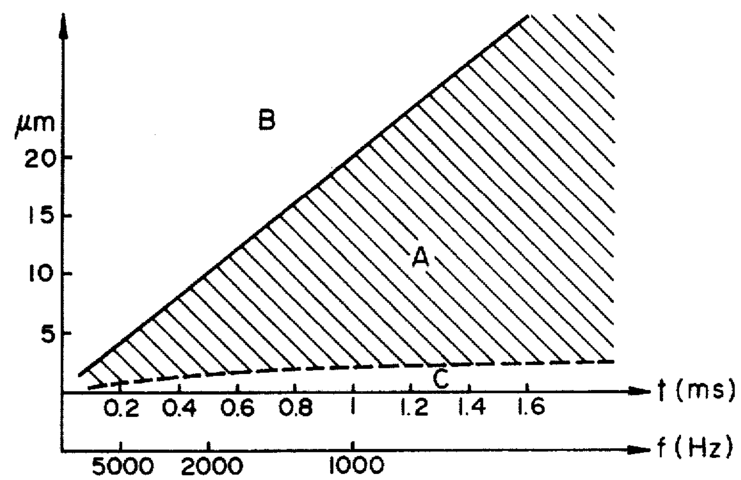
FIG. 4 is a graph for explaining characteristics of a liquid ejecting recording head according to the present invention.

In FIG. 4, there is shown a graph illustrating characteristics of a liquid jet recording head according to the present invention. The abscissa is a driving frequency f(Hz) of an electrothermal transducer upon driving said transducer, or its repitition period t(ms) and the ordinate is L, and the results shown in the graph are obtained by recording by a pulse signal of a driving frequency f of 0.2 ms–1.6 ms (repitition period t) and duty 1/100.

The hatched region A is a characteristic region of the recording head. This shows that a high frequency driving can be effected with a high energy efficiency. The region B is a region where liquid droplet ejection is not effected in response to the driving frequency f, that is, liquid droplet ejection does not occur with fidelity to the driving signal and intermittent ejection occurs.

In the region C, there is not any particular problem as to liquid droplet ejection property, but energy efficiency of liquid droplet ejection is lowered.

As the substrate used in the recording head of the present invention, there may be mentioned glass, ceramics, plastics or these materials whose surface is rendered thermally conductive, or metals, photosensitive glasses, photosensitive ceramics and the like.

By designing the layer structure of an electrothermal transducer 2 constituting a liquid jet recording head in such a manner as mentioned above, heat energy generated by input electric signal P applied to electrothermal transducer 2 acts upon the liquid in a heat actuating portion 7 at a high efficiency and the resulting force for driving the liquid droplet ejection is effectively utilized for the ejection. Since the heat response characteristic is very good, frequency of the ejection can be increased to a great extent. Even upon a continuous liquid droplet ejection for a long time and repeated use, there is shown a very good stability. In addition, the ejection speed in remarkably fast. In this way, the liquid jet recording head according to the present invention has excellent characteristics which satisfy various conditions required for a high speed recording.

The reason why the liquid jet recording head according to the present invention shows such excellent characteristics and performance as mentioned above is as shown below. The relation among the thicknesses of upper layer 12, resistive heater layer 11 and lower layer 10 constituting a heat generating portion 8 of electrothermal transducer 2 of the recording head satisfies the above mentioned formulas (1) and (2). By designing the head as mentioned above, when a liquid droplet is ejected, the heat generated at the resistive heater layer 11 is rapidly transferred to the liquid existing in the heat actuating portion 7 to generate a bubble and the abrupt increase in the volume of this bubble causes a rapid change of state and thereby the resulting actuating force causes the ejection of the liquid droplet. After the liquid droplet has been ejected, application of an electric signal P to the electrothermal transducer 2 is switched off, and as the result, the heat retained in the heat actuating portion 7 and the heat generating portion 8 is rapidly discharged to the substrate 2 side and the temperatures as such portions are rapidly lowered, and thereby the volume of the formed bubble shrinks rapidly. This shrinkage of the bubble volume induces introduction of the liquid into the heat actuating portion 7 to supply rapidly and smoothly a volume of the liquid corresponding to the volume of the ejected liquid, and thereby the next ejection can be ready in a moment.

The structure of the electrothermal transducer of the liquid jet recording head of the present invention is markedly different from that usually used for a thermal printer, i.e. so-called "thermal head" since the material to be heated in the present invention is liquid.

Such electrothermal transducer for thermal printers can not be used for the present invention since various characteristics thereof are not suitable for the present invention, for example, the life of the thermal head is extremely short. Moreover, the material to be heated in the thermal printer is a heat-sensitive paper while it is a liquid in the present invention, and therefore, the technique of designing the thermal head does not serve to design the electrothermal transducer of the present invention.

A liquid jet recording head produced in accordance with the manner as mentioned above can sufficiently attain the objects of the present invention.

In addition, the objects of the present invention can be also attained by operating the liquid jet recording head under some of the following conditions. One operation condition is that the liquid jet recording head is driven under a condition that an average value, $$\overline{\frac{dV}{dt}/V\text{max}},$$

of a bubble volume changing ratio is at least $5\times10^3$ $\text{sec}^{-1}$, where dV/dt is a change of the volume V of a bubble per unit time when the volume of bubble increases, the bubble being produced by the heat energy which is generated at the electrothermal transducer 2 energized by an input electric signal of on-off operation and is applied to the liquid in the heat actuating portion 7, and Vmax is the maximum volume of the bubble.

Figure 5:
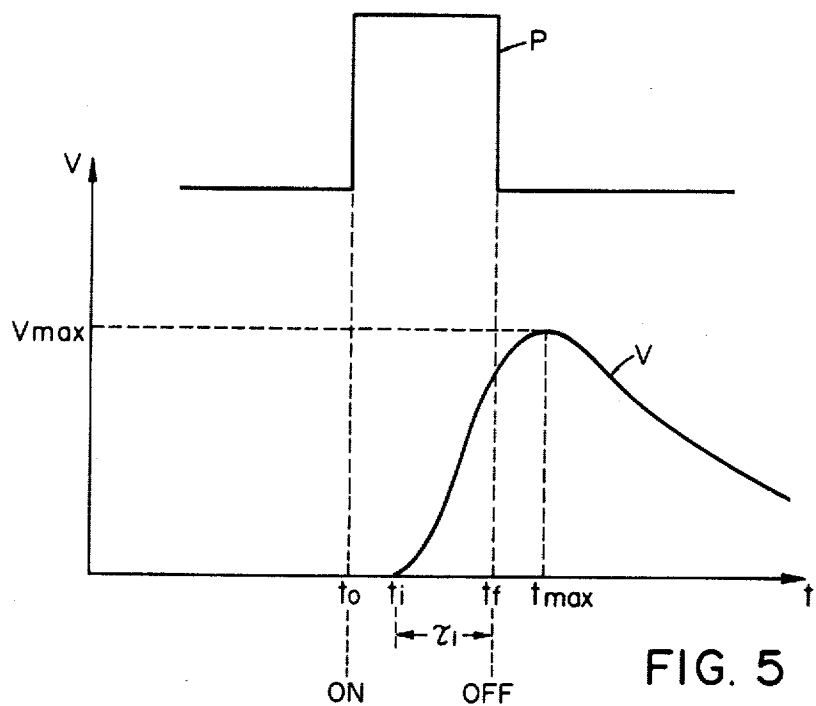
FIGS. 5 and 6 are timing charts showing changes of an electric signal P applied to the recording head and the volume of the generated bubble in accordance with the lapse of time.

Referring to FIG. 5, the graph shows that an electric signal of a pulse shape indicated by P is applied to the electrothermal transducer of the recording head and the volume V of a bubble formed in the heat actuating portion changes as the time plases.

When the electric signal P is applied to the electrothermal transducer as an on-off operation at a time $t_o$ and a time $t_f$, a bubble is formed at a time $t_i$ in the heat actuating portion 7 and the volume V of the bubble begins to increase at the time $t_i$ and reaches the maximum volume V max at a time tmax. At the time $t_f$, the electric signal is off and the volume V of the bubble begins to decrease at the time tmax. When the electric signal is off and the volume of the bubble V decrease, the rate of decrease of the volume depends on the change in volume V of the bubble with lapse of time at time $\tau_1$.

According to the present invention, the average value $$\left(\overline{\frac{dV}{dt}/V\text{max}}\right),$$

of a bubble volume changing ratio with lapse of time is at least $5\times10^3$ $\text{sec}^{-1}$ upon heating and the volume (V) change curve of the bubble is made such that the curve satisfies said condition, i.e. at least $5\times10^3$ $\text{sec}^{-1}$. Thus, when electric signal P is off, any particular cooling means is not necessary for making effectively the decaying curve of the bubble volume V steep, and the object of the present invention can be sufficiently attained. The average value, $$\left(\overline{\frac{dV}{dt}/V\text{max}}\right).$$

is preferably at least $2\times10^4$ $\text{sec}^{-1}$, more preferably at least $4\times10^4$ $\text{sec}^{-1}$.

According to these operation conditions, the volume of the ejected liquid droplet is uniform, the direction of the liquid droplet ejection is stable, the ejection speed is uniform, and the response to recording signals is of high fidelity, and in addition, images of high resolution and high quality can be easily recorded at a high speed.

Furthermore, the temperature change at the heating surface is of such a wave form, and thereby the heat energy generated in the heat actuating portion by input electric signal to the electrothermal transducer acts on the liquid in the heat actuating portion with a high efficiency and the resulting actuating force for liquid droplets ejection is effectively consumed for liquid droplet ejection so that the liquid droplet ejecting energy can be reduced.

According to another operating condition for the liquid jet recording head, the object of the present invention can be attained. The operating condition is as shown below:

$1/5\tau_o\leqq\tau_{\frac{1}{2}}\leqq10\tau_o$, preferably $\tau_o\leqq\tau_{\frac{1}{2}}\leqq10\tau_o$ at $0<\tau_o\leqq10$ μs, or 2 $\mu s\leqq\tau_{\frac{1}{2}}\leqq10\tau_o$, preferably 2 $\mu s\leqq\tau_{\frac{1}{2}}\leqq\tau_o$ at 10 $\mu s<\tau_o$ where $\tau_o$ is a time during which an electric signal P is applied, V is a volume of a bubble produced when the electric signal is applied, Vmax is the maximum value of V, and $\tau_{\frac{1}{2}}$ is a time required to decrease the volume of the bubble from Vmax to Vmax/2.

Figure 6:
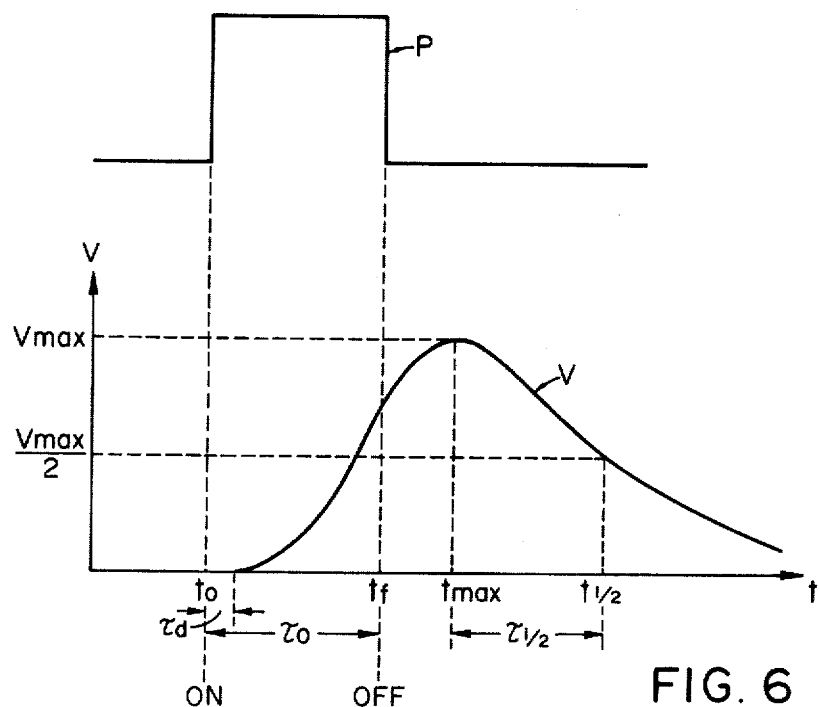

Referring to FIG. 6, the change in volume of the bubble with lapse of time is illustrated. The bubble is that generated upon applying a pulsewise electric signal P to the electrothermal transducer of the recording head.

A pulsewise electric signal P is applied to the electrothermal transducer. The signal P is such that the on-off operation is effected at the times $t_o$ and $t_f$, respectively. A bubble is formed at the time later than $t_o$ by $\tau_o$ and the volume V increases with lapse of time and reaches the maximum volume Vmax at the time tmax. When the electric signal P is off at the time $t_f$, the volume V of the bubble begins to decrease at a time a little later than said $t_1$.

By maintaining the relation between the rising and the descending curves as to change in volume V of a bubble with lapse of time as mentioned above, the descending curve can be made steep as far as possible. Therefore, the object of the present invention can be sufficiently attained.

Further, the change of the bubble volume is made such a wave form satisfying the above mentioned relation, and thereby the heat energy generated in the heat actuating portion by input electric signal to the electrothermal transducer acts on the liquid in the heat actuating portion with a high efficiency and the resulting actuating force for liquid droplet ejection is effectively consumed for liquid droplet ejection so that the liquid droplet ejecting energy can be reduced.

According to a further operating condition for the liquid jet recording head, the object of the present invention can be achieved. The operating condition is that the average value $$\left(\overline{\frac{dT}{dt}}\right)$$

of a change of a temperature T per unit time during the time from beginning of a temperature rise at a temperature $T_i$ to reaching the maximum temperature Tp is at least $1\times10^6$ °C./sec, where T is a temperature of the heating surface 9 when the electrical signal is applied to the electrothermal transducer 2 by an on-off operation. When the liquid jet recording head is operated under the above mentioned condition, the volume of the ejected liquid droplet is uniform, the direction of the liquid droplet ejection is stable, the ejection speed is uniform, and the response to recording signals is of high fidelity, and in addition, images of high resolution and high quality can be easily recorded at a high speed.

Further, by making the temperature change at the heating surface in such a wave form as mentioned above, the heat energy generated in the heat actuating portion by input electric signal to the electrothermal transducer acts on the liquid in the heat actuating portion with a high efficiency and the resulting actuating force for liquid droplet ejection is effectively consumed for liquid droplet ejection so that the liquid droplet ejecting energy can be reduced.

Figure 7:
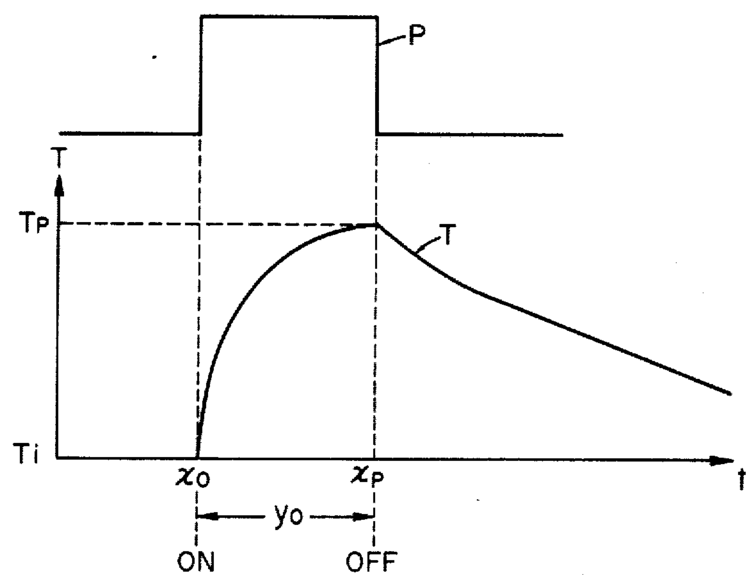
FIGS. 7 and 8 are timing charts showing changes of an electric signal P applied to the recording head and the surface temperature of heating surface 9 in accordance with the lapse of time.

FIG. 7 shows change in surface temperaure T of the heating surface with lapse of time when electric signal of a pulse wave form, denoted by symbol "P" is input to the electrothermal transducer formed on the recording head portion.

Now, when electrical signal P in a pulse form, which is turned on and off at time points $x_o$ and $x_p$, is input to the electrothermal transducer, the temperature T of the heating surface starts rising from temperature $T_i$ at the time $x_o$ and reaches a maximum temperature Tp at the time $x_p$. When the electric signal P is turned off at the time $x_p$, the surface temperature T begins to lower. This lowering speed of the surface temperature T depends greatly upon value of $$\left(\overline{\frac{dT}{dt}}\right)$$

which is an average of dT/dt, that is, a change of surface temperature T per unit time during time $y_o$. By establishing a curve of temperautre change so that an average value $$\left(\overline{\frac{dT}{dt}}\right)$$

of dT/dt upon heating may be at least $1\times10^6$°C./sec as described in the present specification, a lower curve of the temperature of the heat actuating surface upon off-operation of the electric signal P can be made rapid effectively without a particular cooling means, and the objects of the present invention can be satisfactorily achieved.

In the present invention, the average value $$\left(\overline{\frac{dT}{dt}}\right)$$

is controlled to $1\times10^6$°C./sec or more as mentioned above, but may be more preferably $3\times10^6$°C./sec or more, optimumly $1\times10^7$°C./sec or more.

Further, the objects of the present invention can be achieved also by driving the liquid ejecting type recording head under conditions that:

$y_o \leqq y_{\frac{1}{2}} \leqq 4y_o$ at $0<y_o\leqq 10\mu s$, and $10\mu s \leqq y_{\frac{1}{2}} \leqq 4y_o$ at $10\mu s<y_o$ where $y_{\frac{1}{2}}$ is a time required to decrease the temperature from Tp to (Tp-Ti)/2 when one signal P is applied to the electrothermal transducer by the on-off operation, and the other symbols are as defined in the foregoing.

Figure 8:
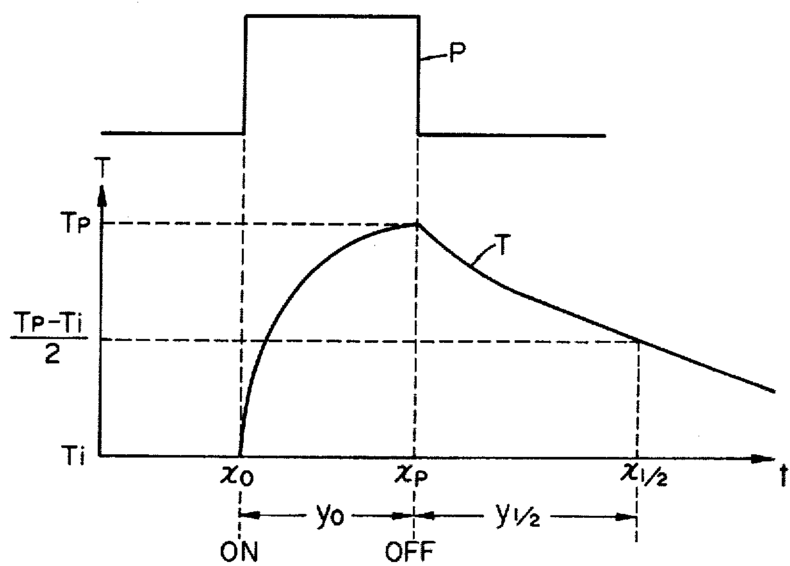

FIG. 8 shows change in temperature T of the heating surface with lapse of time when electric signal P in a form of pulse wave is input to the electrothermal transducer formed on the recording head portion.

Now, when electric signal P in a pulse form, which is turned on and off at the time $x_o$ and $x_p$, is input to the electrothermal transducer, the temperature T of the heat actuating surface begins to rise from temperature $T_i$ at the time $x_o$ and reaches maximum temperature Tp at the time $x_p$. When the electrical signal P is turned off at the time $x_p$, the surface temperature T begins to decrease.

In the present invention, decreasing change in the surface temperature T with lapse of time is selected so that the decreasing curve of the surface temperature T may fall within the above-mentioned range of the relationship between $y_{\frac{1}{2}}$ and $y_o$, where $y_{\frac{1}{2}}$ is a time required to decrease the temprature from Tp to (Tp-Ti)/2. When the relationship between the increasing curve and decreasing curve in change in the temperature T of the heating surface is retained under the foregoing conditions, the decreasing curve can be made as rapid as possible technically.

The following examples are given for illustrating the present invention, but not for restriction.

EXAMPLE 1

On an alumina substrate was formed an $SiO_2$ layer as a lower layer in the thickness of 8μm by sputtering and then a $HfB_2$ layer was formed in the thickness of 500Å as a resistive heater layer by sputtering, and further an Al layer was formed in the thickness of 5000Å as an electrode by sputtering. Selective etching was applied to produce a pattern of a resistive heater layer of 50 microns×500 microns.

Onto the whole surface was sputtered $SiO_2$ to form an upper layer of 0.5 microns thick. Thus there was produced an electrothermal transducer on the alumina substrate.

A grooved plate having one groove of 50 microns wide was placed on the substrate in such a manner that the groove covered the heat generating portion of the electrothermal transducer and was bonded to the substrate by an adhesive.

The resistance of the resistive heater layer between the electrodes of the resulting recording head was 10 ohms.

To the liquid jet recording head was applied a driving signal having a pulse width of 10μs and a repetition period of 1 ms. The recording head responded to the signal frequency with high fidelity to eject a liquid droplet to effect a very good recording.

The power consumption upon conducting current was 10 watt and the efficiency of liquid droplet ejecting energy was high.

In this recording head, the dimensions were:

$L=8.5$ microns $L_1=0.5$ microns $L_2=8$ microns

Another recording head was produced by following the above procedure except that $L_2=4$ microns in place of $L_2=8$ microns. The same test was carried out. The powder consumption was 20 watt. This shows the efficiency of liquid droplet ejection energy is very low.

Ta was sputtered onto the $SiO_2$ layer (0.5 microns) of the recording head produced at the beginning of this working example to form a Ta layer of 4 microns thick. Except the resulting upper layer composed of an $SiO_2$ layer and a Ta layer was used, the above mentioned procedures were followed. The power consumption was 14 watt. This shows the liquid droplet ejecting characteristics are good.

In Table 1 (infra), minimum energy for ejecting a liquid droplet, Qmin, and liquid droplet ejecting states for recording heads No. 1-No. 11 are shown. These heads were produced under the same conditions as above except that $L_1$ (thickness of an upper layer), $L_2$ (thickness of a lower layer) and the construction materials were varied.

EXAMPLE 2

An $SiO_2$ layer was formed on an alumina substrate as a lower layer in the thickness of 4 microns by sputtering method, and then a $HfB_2$ layer was formed as a resistive heater layer in the thickness of 2000 Å by the sputtering, and further an Al layer was laminated as an electrode in the thickness of 3000 Å by the sputtering. Selective etching was carried out to produce a pattern of the resistive heater having a size of 80 microns×200 microns.

Onto the resulting structure was laminated by the sputtering as a protective layer (upper layer) in the thickness of 0.5 microns so that an electrothermal transducer was formed on the substrate.

A grooved glass plate having a groove of 80 microns width and 80 microns depth was placed and bound to the structure in such a manner that the groove is coincided with the resistive heater. The edge surface of the orifice was abraded to adjust the distance between the edge of the resistive heater and the orifice to 300 microns so that a recording head was prepared.

An ink mainly composed of a black dye and ethanol was supplied to the heat actuating portion under the back pressure of 0.1 atmosphere, and signal of square voltage pulse of 10 μs and 30 V was continuously input to the electrothermal transducer in a repetition period of 200 μs for 10 hours. The recording head ejected liquid droplets with high fidelity and reliability in accordance with the input signal.

The state of the liquid droplets ejected from the orifice of the recording head as well as change in the volume of the bubble formed on the heat actuating surface were measured in such a manner that a strobe was turned on and off while synchronized with the input signal, the results of which are shown in Table 2 (infra). Further, the pulse width of the input signal was simultaneously changed to vary the value of $$\left(\frac{dV}{dt}/V\max\right),$$

and at that time, state of ejection, maximum response, frequency, energy consumption and ejection speed were also measured, the results of which are shown. These results make it clear that particularly excellent ejection is achieved within the scope of the present invention.

EXAMPLE 3

An $SiO_2$ layer having a thickness of 5 microns was formed as a lower layer on an alumina substrate by the sputtering method, and a $HfB_2$ layer having a thickness of 1000 Å as a resistive heater layer and an Al layer of 3000 Å thick as an electrode layer were, in succession, laminated by the sputtering method. Selective etching was conducted to form a pattern of the resistive heater having a size of 50 microns×200 microns. An $SiO_2$ layer having a thickness of 3500 Å was then laminated as a protective layer (upper layer) on the resulting structure by the sputtering method so that an electrothermal transducer was formed.

A grooved glass plate having a groove of 50 microns width and 50 microns depth was placed on and bound to the structure so that the groove might be coincided with the resistive heater. Subsequently, the edge surface of the orifice was abraded to control the distance between the top of the resistive heater and the orifice to 250 microns so that a recording head was prepared.

While an ink composed mainly of a black dye and ethanol was supplied to the heat actuating portion of the recording head under a back pressure of 0.015 atmosphere, printing signal of square voltage pulse of 20 μs and 45 V was continuously input to the electrothermal transducer in a repetition period of 200 μs for 10 hours. At that time, liquid droplets were ejected from the recording head with high fidelity and reliability in accordance with the input signal.

In that case, when changes in the temperature of the heat actuating surface per one pulse signal were measured with respect to the initial to 1000 pulses, curves of change having the same form were obtained in all cases, and the value of $y_{\frac{1}{2}}$ was 30 μs.

On the other hand, the same recording test as above was repeated except that a coolant was brought into contact with the back surface of the alumina substrate to decrease the temperature of the back surface of the silicon substrate to about −30° C. and this forced cooling was conducted while synchronized with the printing signal. As a result, where the forced cooling was suddenly carried out and synchronized with the signal, non-uniformity in amount of ejected droplets, disorder in the direction of ejecting droplets and irregularity in the speed of ejection took place undesirably so that images of high quality could not be obtained. In addition, the recording speed could not be made higher in conformity with the printing signal, and intermittent ejection of droplets took place. In this case, change in the temperature of the heat actuating surface was measured. As a result, curves indicating the temperature change took different forms in each printing signal pulse, and in average of 1000 printing signal pulses the value of $y_{\frac{1}{2}}$ was 8 μs.

Next, the recording was carried out by using the same recording head and changing the pulse width $y_o$ of the printing signal to 10 μs, 50 μs and 3 μs. In each case, the recording was conducted without the forced cooling, with the forced cooling being continuously performed to decrease the temperature of the back surface of the substrate to −30° C., or with the forced cooling being synchronized with the printing signal. At that time, the values of $y_{\frac{1}{2}}$ were measured, and the obtained images were evaluated, the results of which are shown in Table 3 (infra).

EXAMPLE 4

An $SiO_2$ layer having a thickness of 3 microns was formed as a lower layer on a alumina substrate by the sputtering method, and a $HfB_2$ layer having a thickness of 1000 Å as a resistive heater layer and an Al layer having a thickness of 3000 Å as an electrode layer were, in succesion, laminated by the sputtering method. Selective etching was carried out to form a pattern of the resistive heater a size of 80 microns×200 microns. An $SiO_2$ layer of 0.5 microns thickness was then laminated as a protective layer (upper layer) by the sputtering method so that an electrothermal transducer was formed on the substrate. A grooved glass plate having a groove of 80 microns width and 80 microns depth was placed on and bound to the resulting structure so that the groove might be coincided with the resistive heater. The edge surface of the orifice was polished to adjust the distance between the top edge of the resistive heater and the orifice to 300 microns so that a recording head was prepared.

While an ink composed mainly of black dye and ethanol was supplied to the heat actuating portion under a back pressure of 0.1 atmosphere, printing signal of square voltage pulse of 10 μs and 40 V was continuously input to the electrothermal transducer in a repetition period of 200 μs for 10 hours. As a result, liquid droplets were ejected from the recording head with high fidelity and reliability in accordance with the printing signal. Further, a situation of droplet ejection from the orifice of the recording head as well as change in the volume of the bubble formed on the heat actuating surface were measured in such a manner that a strobe was turn on and off while synchronized with the time of applying the voltage. The obtained results are shown in Table 4 (infra). Besides, the input pulse width was changed simultaneously therewith and therefore the value of $$\left(\frac{dT}{dt}\right)$$

was varied. At that time, a state of droplet ejection, maximum response frequency, energy consumption and ejection speed were measured, the results of which are also shown in Table 4.

As is understood from these results, particularly excellent ejection capability was achieved within the scope of the present invention.

EXAMPLE 5

An $SiO_2$ layer having a thickness of 3 microns was formed as a lower layer on a silicon substrate by the sputtering method, and a $HfB_2$ layer having a thickness of 1000 Å as a resistive heater layer and an Al layer having a thickness of 3000 Å as an electrode layer were, in succession, laminated by the sputtering method. Selective etching was carried out to form a pattern of the resistive heater having a size of 80 microns×200 microns. An $SiO_2$ layer of 0.5 microns thickness was then laminated as a protective layer (upper layer) by the sputtering method so that an electrothermal transducer was formed on the substrate. A grooved glass plate having a groove of 80 microns width and 80 microns depth was bound to the resulting structure so that the groove might be coincided with the resistive heater. The edge surface of the orifice was polished to adjust the distance between the top edge of the resistive heater and the orifice to 300 microns so that a recording head was prepared.

While an ink composed mainly of a black dye and ethanol was supplied to the heat actuating portion under a back pressure of 0.01 atmosphere, printing signal of square voltage pulse of 20 μs and 40 V was continuously input to the electrothermal transducer in a repetition period of 200 μs for 10 hours. As a result, liquid droplets were ejected from the recording head with complete fidelity and reliability in accordance with the printing signal.

Where change in temperature of the heat actuating portion per one pulse signal was measured with respect to the initial to 1000 pulses, it took a curve of the same form in all cases, and $y_{\frac{1}{2}}$ was 27 μs.

The same recording test as mentioned above was conducted by using the same recording head except that a coolant was brought into contact with the back surface of the silicon substrate to decrease the temperature of the back surface of the substrate to −30° C. and this forced cooling was synchronized with the printing signal. When the forced cooling was suddenly carried out while synchronized with the printing signal, non-uniformity in the amount of ejected droplets, disorder in the direction of ejecting droplets and irregularity in the speed of ejecting droplets took place undesirably, and images of high quality could not be obtained. Besides, the recording speed could not be increased in conformity with the printing signal, and further intermittent ejection of droplets took place. In this case, change in the temperature of the heat actuating surface was measured in the same manner as mentioned above. At that time, the curves of the temperature change took different forms in each printing signal pulse, and in an average of 1000 signal pulses the value of $y_{\frac{1}{2}}$ was 8.5 μs.

Next, the same recording head was used, but the pulse width (corresponding to $y_o$) of the printing signal was changed to 10 μs, 50 μs and 3 μs, and in each case of which, the recording was carried out without the forced cooling, or with the continuous forced cooling to decrease the temperature of the back surface of the substrate to −30° C., or with the forced cooling synchronized with the printing signal pulse. In each case, the value of $y_{\frac{1}{2}}$ was measured, and the recorded image was evaluated, the results of which are shown in Table 5 (infra).

EXAMPLE 6

An $SiO_2$ layer having a thickness of 5 microns was formed as a lower layer on a silicon substrate by the sputtering method, and a $ZrB_2$ layer having a thickness of 2000 Å as a resistive heater layer and an Al layer having a thickness of 2000 Å as an electrode layer were, in succession, laminated by the sputtering method. Selective etching was carried out to form a pattern of the resistive heater having a size of 40 microns ×300 microns. An $SiO_2$ layer of 0.3 microns thickness was then laminated as a protective layer (upper layer) by the sputtering method so that an electrothermal transducer was formed on the substrate. A grooved glass plate having a groove of 40 microns width and 40 microns depth was placed on and bound to the resulting structure so that the groove might be coincided with the resitive heater. The edge surface of the orifice was polished to adjust the distance between the top edge of the resistive heater and the orifice to 400 microns so that a recording head was prepared.

While an ink composed mainly of a black dye and ethanol was supplied to the heat actuating portion under a back pressure of 0.07 atmosphere, printing signal of square voltage pulse of 10 μs and 25 V was continuously input to the electrothermal transducer in a repetition period of 200 μs for 10 hours. As a result, liquid droplets were ejected from the recording head with high fidelity and reliability in accordance with the printing signal.

Further, the pulse width of the signal input to the electrothermal transducer, $$\left(\frac{\overline{dT}}{dt}\right)$$

and $y_{\frac{1}{2}}$ were varied. At that time, a state of droplet ejection, maximum response frequency and energy consumption were measured, the results of which are shown in Table 6 (infra).

From Table 6, it is understood that when the curve of change in the temperature of the heat actuating surface of the electrothermal transducer is selected in accordance with the present invention, extremely good results are obtained.

TABLE 1

| Sample No. | Driving Signal Frequency (KHz) | Driving Signal Pulse Width (μs) | $L_1$ (μm) | $L_2$ (μm) | Qmin ($\times 10^{-4}$ J) | Liquid Droplet Ejecting State | Evaluation |
|---|---|---|---|---|---|---|---|
| 1 | | | $SiO_2$ sputtering 0.5 | $SiO_2$ sputtering 8 | 1.0 | Good | ○ |
| 2 | 1 | 10 | $SiO_2$ sputtering 4 | $SiO_2$ sputtering 8 | 2.0 | Good | Δ |
| 3 | | | $SiO_2$ sputtering 0.5 + Ta sputtering 4 | $SiO_2$ sputtering | 1.4 | Good | ○ |
| 4 | | | $SiO_2$ sputtering 0.5 | $SiO_2$ sputtering 8 | 1.0 | Intermittent Ejection | X |
| 5 | | | $SiO_2$ sputtering 0.5 | $SiO_2$ sputtering 3 | 1.1 | Good | ○ |
| 6 | 5 | 10 | Alumina sputtering 2 | $SiO_2$ sputtering 3 | 1.7 | Good | ○ |
| 7 | | | Alumina sputtering 0.3 | $SiO_2$ sputtering 3 | 0.9 | Good | ○ |
| 8 | | | Alumina sputtering 3 | $SiO_2$ sputtering | 3.5 | Intermittent Ejection | X |
| 9 | | | Alumina sputtering 3 | $SiO_2$ sputtering 2 | 8.6 | Good | Δ |
| 10 | 2 | 50 | Alumina sputtering 3 | $SiO_2$ sputtering 6 | 2.4 | Good | ○ |
| 11 | | | Alumina sputtering 3 | $SiO_2$ sputtering 15 | 2.2 | Intermittent Ejection | X |

Evaluation Standard:
○ Excellent
Δ Good
X Poor

TABLE 2

| Pulse Width of Input Signal (μs) | $\left(\frac{\overline{dV}}{dt}/Vmax\right)$ ($sec^{-1}$) | Maximum Response Frequency (KHz) | Energy Consumption (Joul) $\times 10^{-5}$ | Liquid Droplet Ejection Speed (m/sec) | Overall Evaluation of Recording Characteristics |
|---|---|---|---|---|---|
| 2 | $2.5 \times 10^5$ | 22 | 2 | 7 | ◎ |
| 5 | $1.4 \times 10^5$ | 15 | 4 | — | ◎ |
| 10 | $9 \times 10^4$ | 12 | 5 | 4 | ◎ |
| 20 | $4 \times 10^4$ | 4 | 6 | — | ◎ |
| 50 | $2 \times 10^4$ | 2.5 | 8 | — | ○ |
| 100 | $1 \times 10^4$ | 1.0 | 10 | 2 | Δ |
| 200 | $5 \times 10^3$ | 0.35 | 26 | — | Δ |
| 500 | $2 \times 10^3$ | 0.15 | 40 | — | X |
| 1000 | $1 \times 10^3$ | 0.04 | 78 | — | X |

Overall Evaluation Standard for Recording Characteristics
◎ Excellent
○ Good
Δ Practically Good
X Practically Poor

TABLE 3

| Pulse Width of Input Signal | Forced Cooling | $y_{\frac{1}{2}}$ | Image Evaluation |
|---|---|---|---|
| | None | 25μs | O |
| 10μs | Continuous −30° C. | 7μs | X |
| | Synchronous | Less than 10μs | X |
| | None | 38μs | O |
| 50μs | Continuous −30° C. | Less than 10μs | X |
| | Synchronous | Less than 10μs | X |
| | None | 11μs | O |
| 3μs | Continuous −30° C. | 3μs | Δ |
| | Synchronous | 3μs | Δ |

Evaluation of Image:
O Very Good
Δ Practically Good
X Practically Poor

TABLE 4

| Pulse Width of Input Signal (μs) | $\left(\overline{\frac{dT}{dt}}\right)$ (°C./sec) | Maximum Response Frequency (KHz) | Energy Consumption (Joul) | Liquid Droplet Ejection Speed (m/sec) | Overall Evaluation of Recording Characteristics |
|---|---|---|---|---|---|
| 2 | $2.5 \times 10^8$ | 25 | $2 \times 10^{-5}$ | 7 | O |
| 5 | $7 \times 10^7$ | 17 | $4 \times 10^{-5}$ | — | O |
| 10 | $3 \times 10^7$ | 14 | $5 \times 10^{-5}$ | 4 | O |
| 20 | $1.3 \times 10^7$ | 5 | $7 \times 10^{-5}$ | — | O |
| 50 | $4 \times 10^6$ | 3 | $9 \times 10^{-5}$ | — | Δ |
| 100 | $1.8 \times 10^6$ | 1.2 | $1.1 \times 10^{-4}$ | 2 | Δ |
| 200 | $8.5 \times 10^5$ | 0.4 | $2.0 \times 10^{-4}$ | — | X |
| 500 | $3 \times 10^5$ | 0.2 | $4.6 \times 10^{-4}$ | — | X |
| 1000 | $1.4 \times 10^5$ | 0.05 | $9.0 \times 10^{-4}$ | — | X |

Overall Evaluation Standard for Recording Characteristics:
Excellent
Δ Practically good
X Practically poor

TABLE 5

| Pulse Width of Input Signal $y_o$ | Forced Cooling | $y_{\frac{1}{2}}$ | Image Evaluation |
|---|---|---|---|
| | None | 20μs | O |
| 10μs | continuous −30° C. | 8μs | X |
| | Synchronous | Less than 10μs | X |
| | None | 35μs | O |
| 50μs | Continuous −30° C. | Less than 10μs | X |
| | Synchronous | Less than 10μs | X |
| | None | 7μs | O |
| 3μs | Continuous −30° C. | 3μs | Δ |
| | Synchronous | " | Δ |

Evaluation Standard:
O Very good
Δ Practically good
X Practically poor

TABLE 6

| Pulse Width (μs) | $\overline{(dT/dt)}$ (°C./sec) | $y_{\frac{1}{2}}$ (μs) | Maximum Response Frequency (KHz) | Energy Consumption (Joul) | Ejection Stability | Overall Evaluation of Recording Characteristics |
|---|---|---|---|---|---|---|
| 5 | $5.0 \times 10^7$ | 10 | 15 | $3 \times 10^{-5}$ | O | ◎ |
| | | 4 | 6 | $3.5 \times 10^{-5}$ | x | x |
| 10 | $2.3 \times 10^7$ | 15 | 12 | $4.5 \times 10^{-5}$ | O | ◎ |
| | | 7 | 3 | $5.4 \times 10^{-5}$ | x | x |
| 20 | $1.0 \times 10^7$ | 25 | 4.0 | $6 \times 10^{-5}$ | O | ◎ |
| | | 9 | 1.4 | $7.7 \times 10^{-5}$ | x | x |
| 50 | $3.0 \times 10^6$ | 32 | 2.5 | $7.5 \times 10^{-5}$ | O | O |
| | | 9 | 1.0 | $9.8 \times 10^{-5}$ | x | x |
| 100 | $1.0 \times 10^6$ | 40 | 1.0 | $1.0 \times 10^{-4}$ | O | Δ |
| | | 10 | 0.7 | $1.6 \times 10^{-4}$ | Δ | x |
| 200 | $7.0 \times 10^5$ | 50 | 0.35 | $1.5 \times 10^{-4}$ | Δ | x |
| | | 15 | 0.25 | $2.1 \times 10^{-4}$ | x | x |

Evaluation Standard:
◎ Excellent
O Good
Δ Practically good
x Practically poor

What we claim is:

1. A liquid jet recording process utilizing a recording head comprising, a liquid ejecting portion including an orifice for ejecting a liquid droplet and a heat actuating portion communicating with the orifice and contacting a heating surface adapted to apply heat energy for ejecting a liquid droplet to the liquid and an electrothermal transducer for generating heat energy which comprises: conducting the recording under a condition that an average value of a bubble volume changing ratio,(dV/dt)/Vmas is at least $5\times10^3$ sec$^{-1}$, where dV/dt is a change of the volume V of a bubble per unit time when the volume of bubble increases, the bubble being produced by the heat energy which is generated at the electrothermal transducer energized by an input electric signal and is applied to the liquid in the heat actuating portion, and Vmax is the maximum volume of the bubble.

2. A liquid jet recording process utilizing a recording head comprising, a liquid ejecting portion including an orifice for ejecting a liquid droplet and a heat actuating portion communicating with the orifice and contacting a heating surface adapted to apply heat energy for ejecting a liquid droplet to the liquid and an electrothermal transducer for generating heat energy, and producing a bubble in the heat actuating portion by the heat energy generated by the electrothermal transducer upon applying an electric signal to the transducer which comprises conducting the recording under a condition, $1/5\tau_o \leqq \tau_{\frac{1}{2}} \leqq 10\tau_o$ at $0<\tau_o\leqq 10\mu s$, or $2\mu s \leqq \tau_{\frac{1}{2}} \leqq 10\tau_o$ at $10\mu s<\tau_o$ where $\tau_o$ is a time during which an electric signal is applied, V is a volume of a bubble produced when the electric signal is applied, Vmax is the maximum value of V, and $\tau_{\frac{1}{2}}$ is a time required to decrease the volume of the bubble from Vmax to Vmax/2.

3. A liquid jet recording process according to claim 2 in which $\tau_o \leqq \tau_{\frac{1}{2}} \leqq 10\tau_o$ at $0 < \tau_o \leqq 10\mu s$, or $10\mu s \leqq \tau_{\frac{1}{2}} \leqq 10\tau_o$ at $10\mu s < \tau_o$.

4. A liquid jet recording process utilizing a recording head comprising, a liquid ejecting portion including an orifice for ejecting a liquid droplet and a heat actuating portion communicating with the orifice and contacting a heating surface adapted to apply heat energy for ejecting a liquid droplet to the liquid and an electrothermal transducer for generating heat energy which comprises: conducting the recording under a condition that the average value $$\left(\frac{dT}{dt}\right)$$

of a change of a temperature T per unit time during the time from beginning of a temperature rise at a temperature Ti to reaching the maximum temperature Tp is at least $1\times10^6$ °C/sec, where T is a temperature of the heating surface when the electric signal is applied to the electrothermal transducer.

5. A liquid jet recording process utilizing a recording head comprising, a liquid ejecting portion including an orifice for ejecting a liquid droplet and a heat actuating portion communicating with the orifice and contacting a heating surface adapted to apply heat energy for ejecting a liquid droplet to the liquid and an electrothermal transducer for generating heat energy which comprises: conducting the recording under a condition that $y_o \leqq y_{\frac{1}{2}} \leqq 4y_o$ at $0 < y_o \leqq 10\mu s$, or $10\mu s \leqq y_{\frac{1}{2}} \leqq 4y_o$ at $10\mu s < y_o$ where $y_o$ is a time from beginning of temperature rise of a temperature T at a temperature Ti to reaching the maximum temperature Tp, the temperature T being a temperature of the heating surface when an electric signal is applied to the electrothermal transducer by an on-off operation, and $y_{\frac{1}{2}}$ is a time required to decrease the temperature from Tp to (Tp-Ti)/2.

6. A liquid jet recording process according to claim 5 in which the average value $$\left(\frac{dT}{dt}\right)$$

of change of the temperature at the heating surface per unit time from Ti to Tp is at least $1\times10^6$ °C/sec.

7. A liquid jet recording head which comprises, a liquid ejecting portion including an orifice for ejecting a liquid droplet and a heat actuating portion communicating with the orifice and contacting a heating surface adapted to apply heat energy for ejecting a liquid droplet to the liquid and an electrothermal transducer for generating heat energy, the electrothermal transducer having a layer structure such that a lower layer, a resistive heater layer and an upper layer are laminated in the above order in the direction from a substrate to the heat actuating portion and the following conditions are satisfied:

$$\sqrt{\frac{k_2}{C_2\rho_2}\,\tau} \leqq L \leqq A - B \qquad (1)$$

$$L_1 < \sqrt{\frac{k_1C_2\rho_2}{k_2C_1\rho_1}} \cdot L_2 \qquad (2)$$

where $L = L_1 + L_H + L_2$, $L_1$, $L_H$ and $L_2$ are thicknesses at a portion corresponding to the heat actuating portion of the upper layer, the resistive heater layer and the lower layer, respectively, $$A = \frac{St}{Q} \cdot \Delta T \cdot \left(\frac{k_1\beta_2 + k_2\beta_1}{\beta_1 + \beta_2}\right)$$

$$B = \frac{k_2L_H}{k_H}$$

$$\beta_1 = \sqrt{C_1\rho_2k_1}\,,\ \beta_2 = \sqrt{C_2\rho_2k_2}$$

$C_1$: Specific heat of the upper layer
$C_2$: Specific heat of the lower layer
$k_1$: Thermal conductivity of the upper layer
$k_2$: Thermal conductivity of the lower layer
$k_H$: Thermal conductivity of the resistive heater layer
$\rho_1$: Density of the upper layer
$\rho_2$: Density of the lower layer
$\tau$: Half-width of an electric signal applied to the electrothermal transducer
$t$: A time between the application of one electric signal and the application of another electric signal
$S$: Area of the heating surface of the upper layer facing the heat actuating portion
$\Delta T$: An average value of temperature difference between the surface temperature of the heating surface and the surface temperature of the surface facing the substrate of the lower layer
$Q$: Quantity of heat generated by one electric signal.

* * * * *